(12) United States Patent
Waldner (10) Patent No.: US 11,718,277 B2
(45) Date of Patent: Aug. 8, 2023

(54) AUTOMATICALLY LATCHING JACK ASSEMBLY FOR A TRAILER

(71) Applicant: OCFab Ltd., Minnedosa (CA)

(72) Inventor: Micheal Justin Waldner, Minnedosa (CA)

( * ) Notice: Subject to any disclaimer, the term of this patent is extended or adjusted under 35 U.S.C. 154(b) by 148 days.

(21) Appl. No.: 17/477,020

(22) Filed: Sep. 16, 2021

(65) Prior Publication Data
US 2022/0089130 A1    Mar. 24, 2022

Related U.S. Application Data

(60) Provisional application No. 63/082,525, filed on Sep. 24, 2020.

(51) Int. Cl.
*B60S 9/10*  (2006.01)
(52) U.S. Cl.
CPC ...................... *B60S 9/10* (2013.01)
(58) Field of Classification Search
CPC ........... B60S 9/02–12; Y10T 16/53992; Y10T 16/540243; Y10T 16/54026; Y10T 16/54035
See application file for complete search history.

(56) References Cited

U.S. PATENT DOCUMENTS

| 3,362,683 A | * | 1/1968 | Hansen | B60S 9/12 |
| | | | | 254/423 |
| 3,658,359 A | * | 4/1972 | Claflin | B60S 9/08 |
| | | | | 254/419 |

* cited by examiner

*Primary Examiner* — Tyrone V Hall, Jr.
(74) *Attorney, Agent, or Firm* — Ryan W. Dupuis; Kyle R. Satterthwaite; Ade & Company Inc.

(57) ABSTRACT

A jack assembly for mounting on the hitch arm of a wheeled implement frame supports the wheeled frame relative to a ground surface upon which the wheeled frame is engaged. A jack frame of the assembly is fixedly mounted onto the implement frame and pivotally supports a leg for movement between a raised transport position and a lowered position to support the implement frame elevated above the ground when stationary. A first catch on a retainer member pivotal on the jack frame cooperates with a second catch on a link member pivotal on the leg. A linear actuator coupled between the jack frame and the link member acts to both (i) release the catches and extend the leg towards the lowered position, and (ii) engage the catches and raised the leg towards the raised position.

9 Claims, 7 Drawing Sheets

FIG. 11 ically latched and unlatched
AUTOMATICALLY LATCHING JACK ASSEMBLY FOR A TRAILER This application claims the benefit under 35 U.S.C. 119(e) of U.S. provisional application Ser. No. 63/082,525, filed Sep. 24, 2021.

FIELD OF THE INVENTION

The present invention relates to a jack assembly operable between raised and lowered positions relative to a wheeled frame, and more particularly, the present invention relates to a jack assembly that is automatically latched and unlatched in the raised position responsive to the jack assembly being actuated between the raised and lowered positions.

BACKGROUND

Jack assemblies are commonly incorporated into trailer frames to disconnect the hitch of the trailer from a towing vehicle and to support the hitch elevated above the ground once detached from the towing vehicle. In some instances, hydraulics are used to automatically deploy the jack; however, latching the jack in a stored position typically requires a latch or pin to be manually operated.

U.S. Pat. No. 3,362,683 by Hansen discloses an example of a hydraulic jack assembly for a vehicle in which a spring biased hook retains the jack assembly in the stored position. Extension of the hydraulics to lower the jack assembly automatically pushes the hook outwardly into a released position; however, the sliding contact required between the jack and the hook to release the hook results in considerable wear on the hook which can lead to failure over time.

SUMMARY OF THE INVENTION

According to one aspect of the invention there is provided a jack assembly operable relative to a wheeled frame to support the wheeled frame relative to a ground surface upon which the wheeled frame is supported, the jack assembly comprising:

a jack frame arranged to be supported in fixed relation to the wheeled frame;

a leg pivotally supported on the jack frame such that the leg is pivotal relative to the jack frame about a first pivot axis between a raised position adjacent the jack frame and a lowered position extending downwardly from the first pivot axis such that a bottom end of the leg is lower in the lowered position than in the raised position;

a retainer member pivotally supported on the jack frame such that the retainer member is pivotal relative to the jack frame about a second pivot axis spaced from the first pivot axis;

the retainer member including a first catch surface thereon;

the retainer member being pivotal between a latched position and an unlatched position in which the first catch surface is closer to the first pivot axis in the unlatched position than in the latched position;

the retainer member being biased towards the latched position;

a link member pivotally supported at a first end of the link member on the leg at a location spaced from the first pivot axis;

the link member including a second catch surface formed thereon;

the link member being pivotal relative to the leg between a first position and a second position in which the second catch surface is closer to the first pivot axis in the second position than the first position; and a linear actuator which is actuatable to be extended in length between opposing first and second ends of the linear actuator from a retracted position of the linear actuator to an extended position of the linear actuator;

the first end of the linear actuator being pivotally coupled to the jack frame at an intermediate location between the first pivot axis and the second pivot axis;

the second end of the linear actuator being pivotally coupled to the link member at a location spaced from the first end of the link member;

in the retracted position of the linear actuator, the leg being located in the raised position and the link member being located in the second position such that the second catch surface on the link member is retained on the first catch surface of the retainer member to prevent downward displacement of the leg towards the lowered position;

in the retracted position of the linear actuator, the link member being movable from the second position to the first position to release the second catch surface from the first catch surface in response to initial extension of the linear actuator from the retracted position; and the retainer member being movable from the latched position to the unlatched position against biasing of the retainer member by engagement of the link member in response to retraction of the linear actuator from the extended position to the retracted position.

Use of a pivoting link member between the linear actuator and the leg allows the leg to be automatically latched into the raised position and unlatched from the raised position using pivotal movement between relative parts so as to avoid any considerable sliding contact and associated wear associated with prior art arrangements.

The retainer member preferably comprises a hook defining the first catch surface, the hook having an open side facing outwardly and away from the first pivot axis.

The link member may comprise a crossbar extending parallel to the first pivot axis in which the crossbar defines the second catch surface thereon.

The retainer member preferably includes a camming surface thereon which is slidably engaged by the link member to displace the retainer member from the latched position to the unlatched position against the biasing in response to retraction of the linear actuator from the extended position to the retracted position.

The leg may comprise an upright member spanning a height of the leg in the lowered position and a foot member joined to the upright member at the bottom end of the leg in which the foot member extends transversely outward from the upright member.

In this instance, the link member may be pivotally coupled to the leg in proximity to the bottom end of the leg such that the link member is abutted with the foot member in the foot member in the first position of the link member and is abutted with the upright member in the second position of the link member.

The linear actuator may comprise a hydraulic linear actuator.

The jack assembly may be used combination with a wheeled frame comprising a trailer frame having a hitch arranged for connection to a towing vehicle, in which the jack frame being supported on the trailer frame in proximity to the hitch. For example, the wheeled frame may comprise an agricultural implement frame.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures, there is illustrated a jack assembly generally indicated by reference numeral 10.

The jack assembly 10 is particularly suited for mounting on a wheeled frame, for example a towed implement frame 12 of an agricultural implement 13 that includes wheels that support the frame for rolling movement along the ground and a hitch for connection to a towing vehicle such that the implement follows the vehicle in a forward working direction. The jack assembly 10 is typically supported on a hitch arm of the implement frame in proximity to the hitch at the forward end of the implement frame for lifting the hitch of the implement frame off of the corresponding hitch on the towing vehicle and for supporting the hitch in an elevated position relative to the ground when the implement frame is disconnected from the towing vehicle.

The jacking assembly 10 generally includes a jack frame 14 formed of two parallel side plates at laterally opposing sides of the assembly for mounting in fixed relation to the implement frame 12. The side plates forming the jack frame extend longitudinally between a first end 16 of the assembly at a rear and a second end 18 of the assembly at a front of the assembly.

A leg 20 is pivotally connected to the jack frame 14 so as to be operable relative to the jack frame by pivoting about a first pivot axis 22 between a raised position of the jack assembly in which the leg extends generally alongside the jack frame 14 and a lowered position in which the leg extends generally downwardly from the jack frame such that a bottom and 24 of the leg is lower in elevation than in the raised position relative to the jack frame to increase the overall height of the jack assembly in the lowered position.

The leg 20 includes an upright member 26 spanning a majority of the height of the overall leg and a foot member 28 joined to the upright member 26 at the bottom end 24 of the leg. The upright member 26 is pivotally coupled to the jack frame at the first pivot axis 22 in proximity to the first end 16 of the jack frame corresponding to the top end of the upright member 26. In the lowered position, the upright member extends downwardly at a forward slope towards the second end 18 of the jack frame while spanning substantially the full height of the jack assembly between the jack frame 14 and the bottom end of the leg 20. The upright member 26 is a rigid structural member having a U-shaped profile comprised of two side plates 30 at laterally opposing sides of a bridge plate 32 joined between the side plates while extending along the full length of the upright member. The side plates 30 of the upright member form the pivotal connection to the side plates of the jack frame 14.

The foot member 28 is joined to the bottom end of the upright member 26 and is similarly formed of a rigid structural member having two side plates 34 and a bridge plate 36 which extend continuously from the side plates 30 and bridge plate 32 of the upright member 26. The bridge plate 36 of the foot member is oriented generally horizontally in the lowered position when the upright member is sloped downwardly and towards the second end of the jack frame such that an interior angle between the foot member 28 and the upright member 26 is greater than 90 degrees.

The leg 20 further includes a toe member 38 which is sloped upwardly and outwardly from an end of the foot member 28 opposite to the upright member 26 in the lowered position. The resulting interior angle between the toe member 38 and the foot member 28 is also greater than 90 degrees. The toe member 38 also comprises side plates and a bridge plate which extends continuously from the corresponding side plates 34 and bridge plate 36 of the foot member.

A pair of gusset plates 40 are supported at the junction of the upright member 26 with the foot member 28. The plates are laterally spaced apart and oriented perpendicularly to the first pivot axis 22. The gusset plates 40 are triangular in shape, each having one edge joined to the bridge plate of the upright member 26 and one edge joined to the bridge plate of the foot member 28.

The assembly 10 further includes a link member 42 which is pivotally supported on the leg 20 in proximity to the bottom end thereof. The link member comprises a generally triangular shaped body formed of two side plates 44 which are laterally spaced apart from one another and parallel to one another in the gusset plates 40 received between the two side plates 44. An apex of the triangular body of the link member 42 defines a first end of the link member receiving a pivot shaft 46 therethrough which pivotally couples the first end of the link member 42 to the gusset plates 40 through which the pivot shaft 46 is also received. The interior angle of the triangular body of the link member at the apex at the first end thereof is less than the interior angle between the upright member 26 in the foot member 28 such that the link member is pivotal through a range of approximately 20 to 30 degrees relative to the leg member about a laterally oriented axis of the pivot shaft 46. A crossbar 48 is connected between the side plates 44 of the link member at a second end of the link member opposite from the pivot shaft 46 at the first end thereof.

The link member pivots relative to the leg between a first position in which one edge of the triangular body abuts the foot member 28 and a second position in which a different edge of the triangular body abuts the upright member 26. The crossbar 48 moves towards and away from the first pivot axis 22 as it is displaced between the first and second positions of the link member 42 with the crossbar 48 being nearer to the first pivot axis in the second position and farther from the first pivot axis in the first position of the link member.

The link member 42 also includes an intermediate shaft 50 connected perpendicularly between the side plates 44 of the link member at a location partway between the pivot shaft 46 at the first end of the link member and the crossbar 48 at the second end of the link member.

A linear actuator 52 of the jack assembly is operatively connected between the jack frame at a first end 54 of the linear actuator and the intermediate shaft 50 at the second end 56 of the linear actuator. More particularly, the linear actuator 52 comprises a hydraulic actuator having a cylinder at one end which receives a piston therein at the opposing end so that hydraulic fluid linearly extends and retracts the overall length of the linear actuator between the first end 54 and the second end 56 thereof. The first end is pivotally supported on the jack frame at a central location between the first and second ends thereof. The second end 56 of the actuator is pivotally supported on the intermediate shaft 50 of the link member 42 at a central location between the first and second ends of the link member.

A retainer member 58 is supported on the jack frame and provides the function of a latch for selectively latching the assembly in the raised position. The retainer member 58 includes two side plates 60 which are pivotally coupled on the jack frame for pivotal movement of the retainer member relative to the jack frame about a second pivot axis 62 adjacent to the second end of the jack frame. More particularly, the two side plates 60 of the retainer member are supported at laterally opposing sides of the jack frame so as to be perpendicular to the second pivot axis 62 while being pivotally coupled to respective ones of the side plates of the jack frame 14. The retainer member 58 further includes a bridge plate 64 extending perpendicularly between the two side plates to rigidly couple the side plates for movement together as a singular body of the retainer member.

The retainer member 58 is pivotally coupled at a first end of the body of the retainer member on the jack frame at the second pivot axis 62 so as to extend generally downward therefrom. A hook 66 is formed within the body of the retainer member to define a first catch surface 68 which faces upwardly and serves to selectively engage and retain a corresponding second to catch surface 70 formed on the crossbar 48 of the link member thereon. The open side of the hook 66 which receives the crossbar 48 inserted into and removed from the hook faces outwardly and away from the first pivot axis 22 of the assembly.

Figure 1:
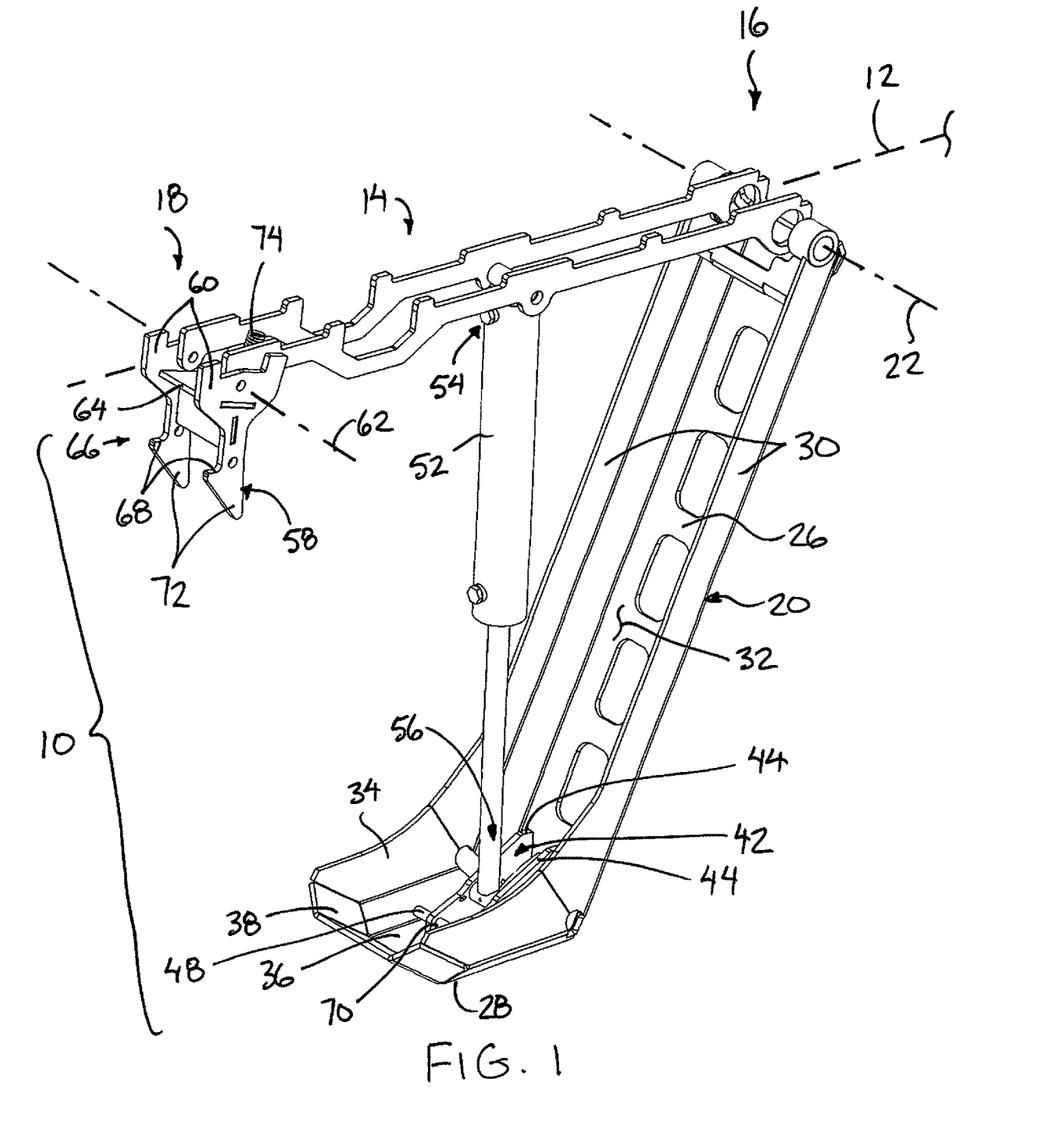
FIG. 1 is a first perspective view of the jack assembly in a lowered position shown supported relative to an implement frame represented in broken line.
Figure 2:
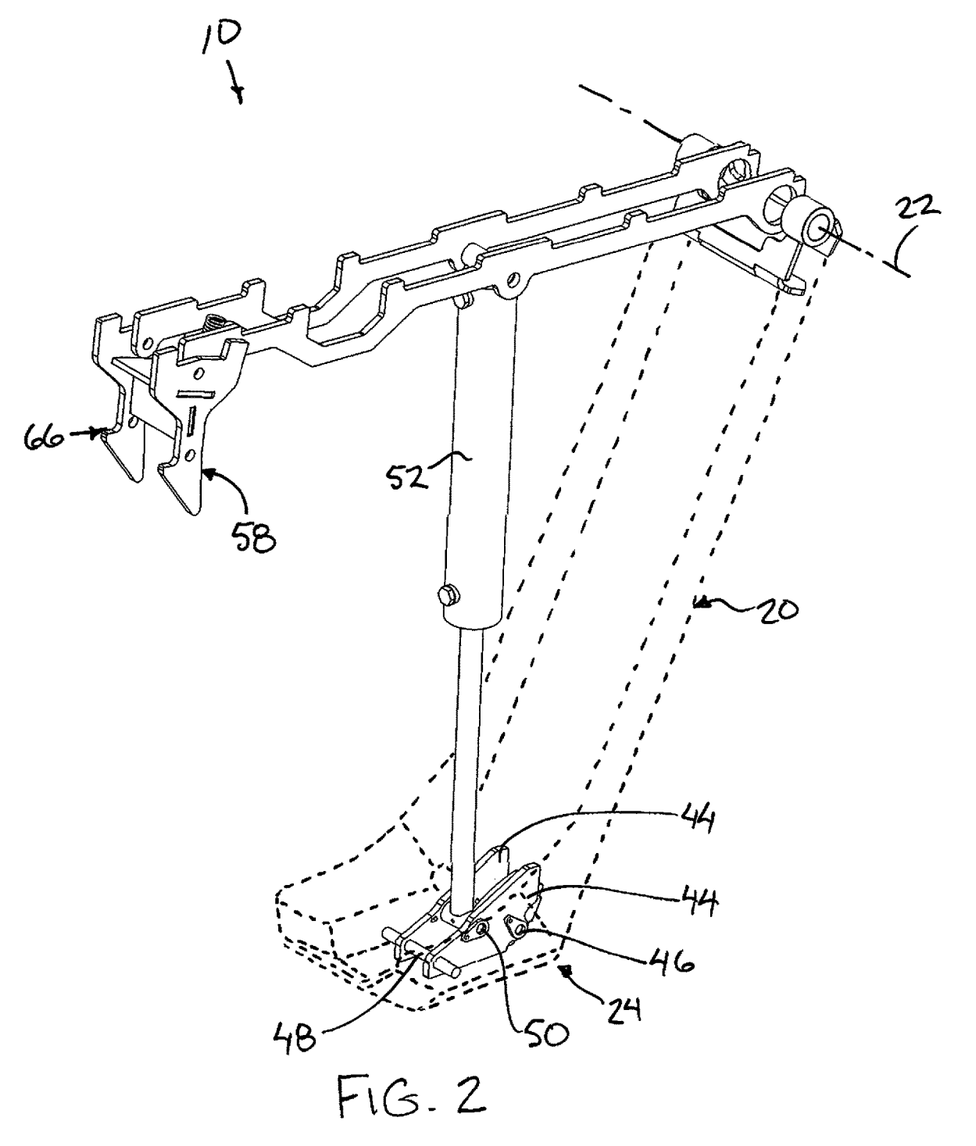
FIG. 2 illustrates the jack assembly according to FIG. 1 with the leg shown in broken line for illustrative purposes.
Figure 3:
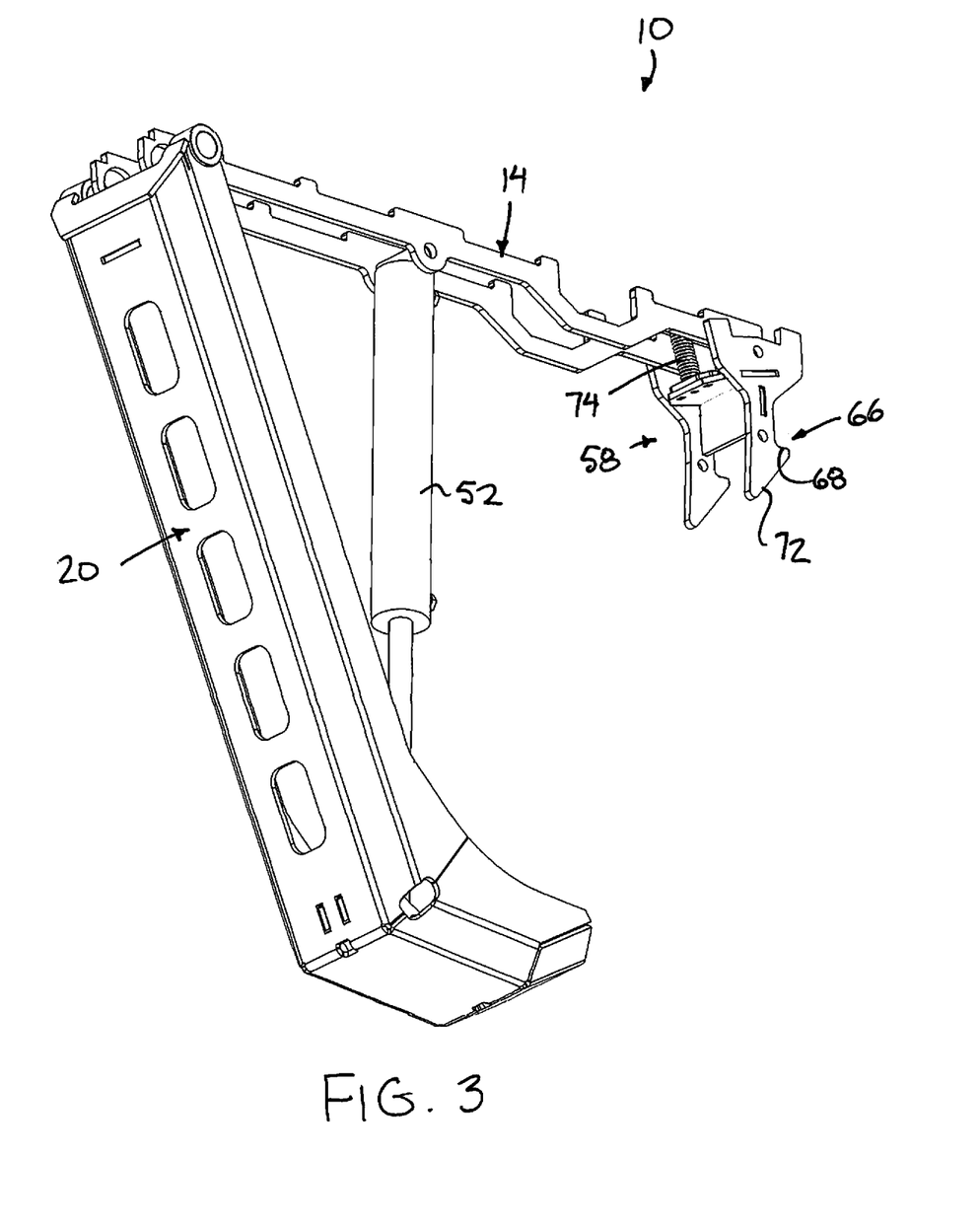
FIG. 3 is another perspective view of the jack assembly in the lowered position.
Figure 4:
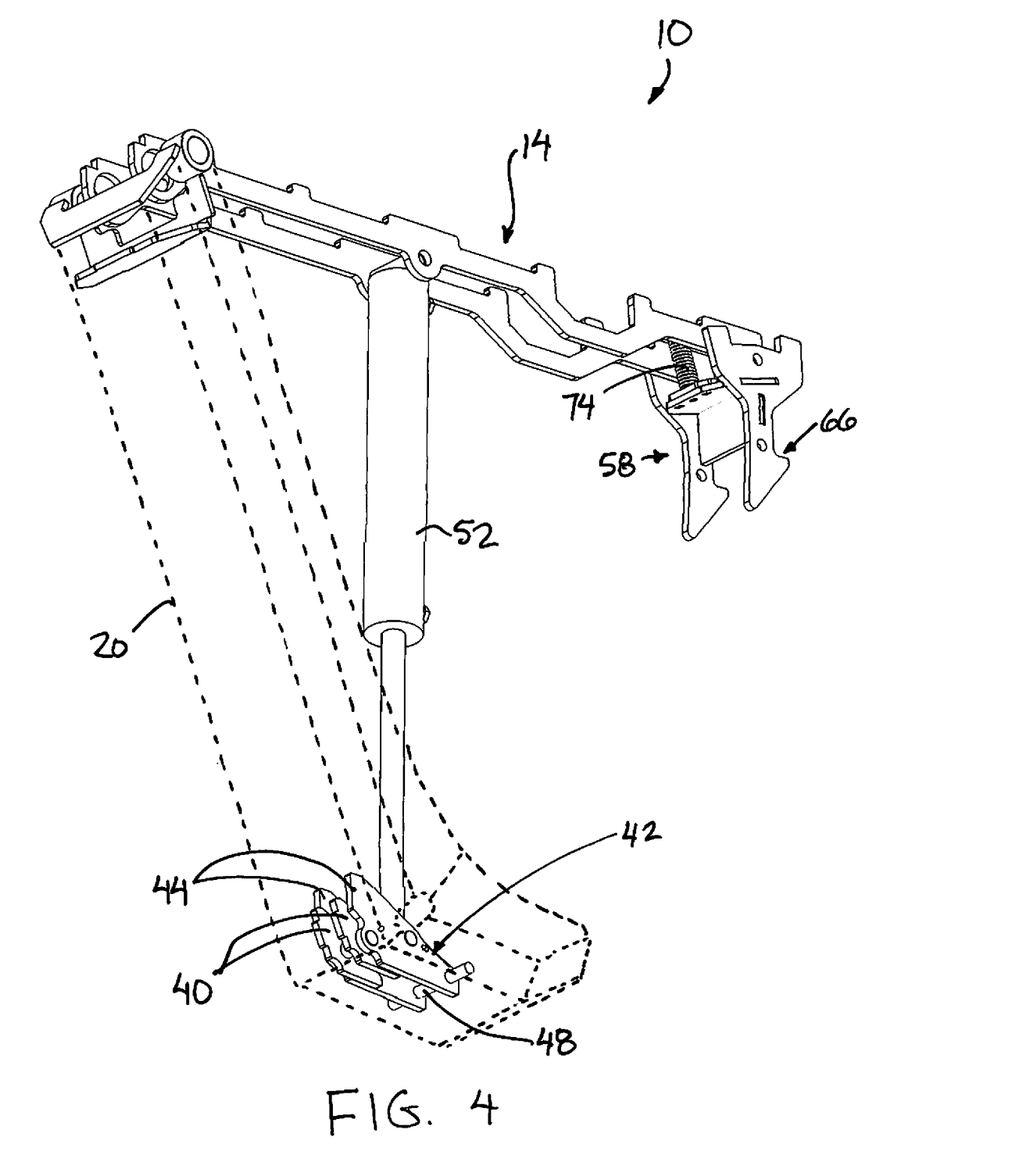
FIG. 4 illustrates the jack assembly according to FIG. 3 with the leg shown in broken line for illustrative purposes.
Figure 5:
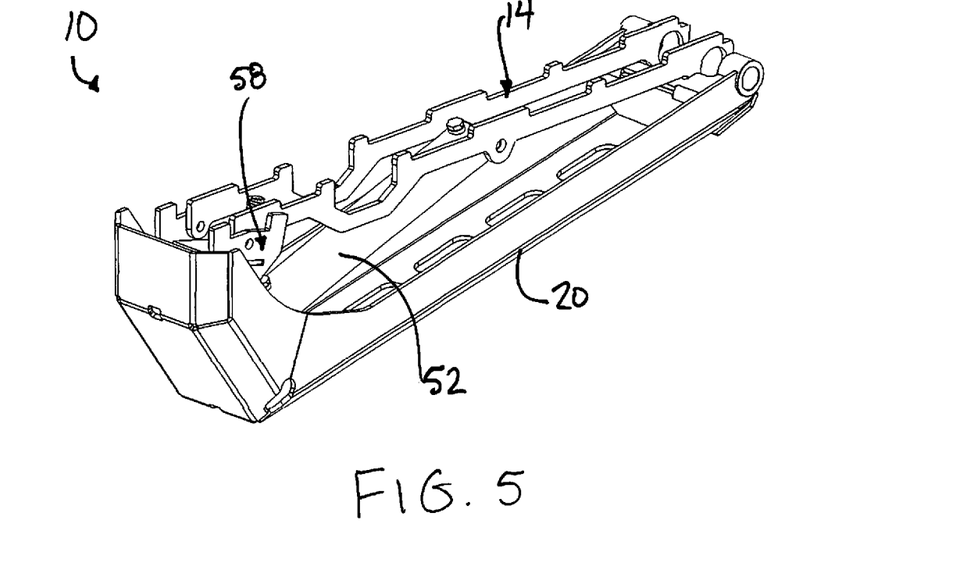
FIG. 5 is a perspective view of the jack assembly in a raised position.
Figure 6:
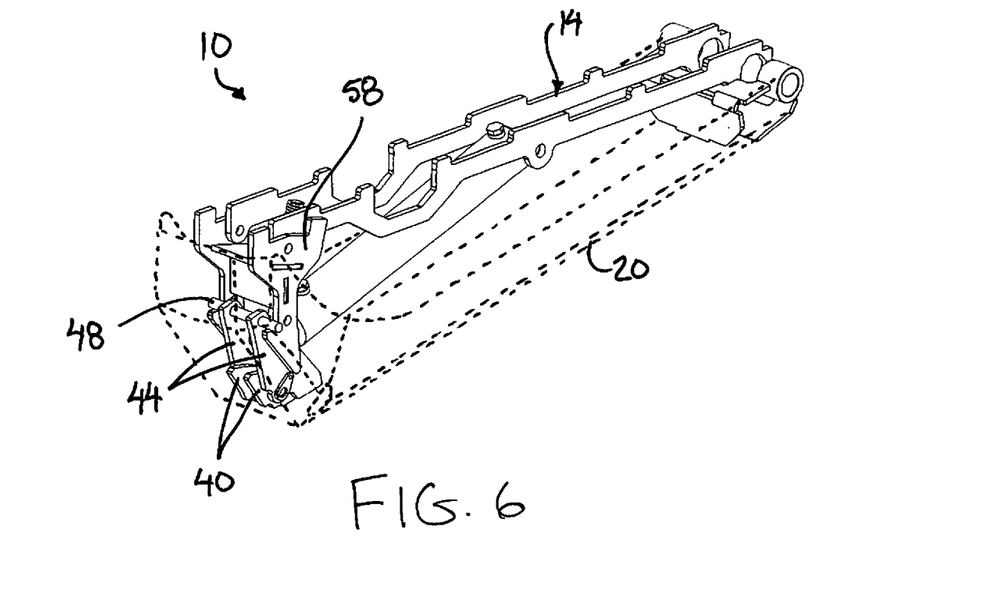
FIG. 6 illustrates the jack assembly according to FIG. 5 with the leg shown in broken line for illustrative purposes.
Figure 7:
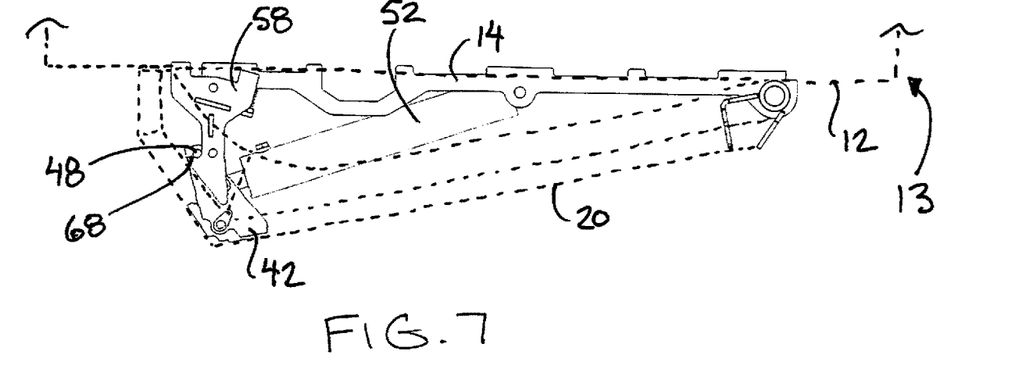
FIG. 7 is a side elevational view of the jack assembly in the raised position.
Figure 8:
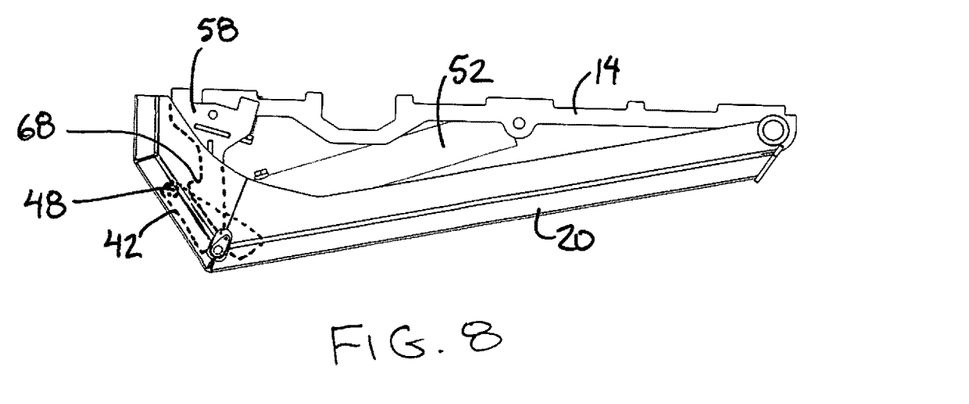
FIG. 8 is a side elevational view of the jack assembly upon initial extension of the linear actuator from the raised position to release the catch on the link member from the catch on the retainer member.

The retainer member 58 is pivotal between a latched position according to FIG. 7 and an unlatched position according to FIG. 8. In the latched position, the hook 66 retains the crossbar 48 hooked thereon by alignment of the first catch surface 68 of the retainer member with the second catch surface 70 on the crossbar, when the link member is in the second position and the retainer member is in the latched position. Displacement of either (i) the retainer member to the unlatched position or (ii) the link member into the first position, will allow the leg member to be raised and lowered relative to the jack frame into and out of the raised position.

In the unlatched position of the retainer member, the first catch surface 68 at the second or bottom end of the retainer member 58 is displaced closer towards the first pivot axis 22 as compared to the latched position so that the first catch surface is no longer aligned with the second catch surface and so that the crossbar is free to be displaced into the raised position with the leg.

Figure 11:
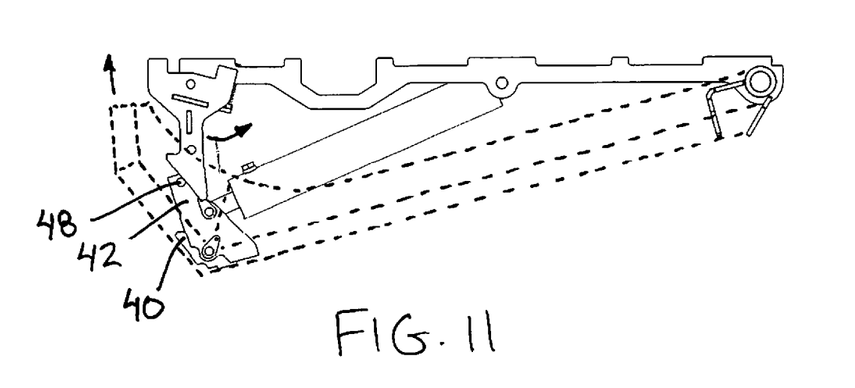
FIG. 11 is a side elevational view of the jack assembly upon initial engagement of the catch on the link member with the catch on the retainer member while partially retracting the leg towards the raised position.

The retainer member 58 comprises a camming surface 72 formed on a bottom and outward facing edge of each of the side plates 60 of the body of the retainer member 58. The camming surface 72 is a sloped surface that is sloped upwardly and outwardly away from the first pivot axis from the bottom of the retainer member to the outer side of the retainer member in alignment with the crossbar when the assembly is retracted towards the raised position. In this manner, when retracting the linear actuator 52 towards the raised position as shown in FIG. 11, the crossbar 48 of the link member 42 will engage the camming surface 72 of the retainer member and cause deflection of the retainer member 58 from the latched position towards the unlatched position.

Once the crossbar is raised above the camming surface 72 and is aligned with the open side of the hook 66 above the first catch surface 68, a spring 74 biases the retainer member to return to the latched position automatically. The spring 74 is mounted under compression between the jack frame and the bridge plate 64 of the body of the retainer member to urge pivotal movement of the retainer member in the direction from the unlatched position towards the latched position.

When the jack assembly is initially in the raised position of FIG. 7, the linear actuator 52 is fully retracted such that the link member 42 at the bottom of the leg is held in the second position thereof with the crossbar above the first catch surface 68 so that the retainer member effectively latches the leg in the raised position. Upon initial extension of the linear actuator as shown in FIG. 8, the link member 42 will be pivoted from the second position to the first position which displaces the second catch surface 70 on the crossbar 48 away from the first pivot axis to release the second catch surface from the first catch surface of the retainer member 58.

Figure 9:
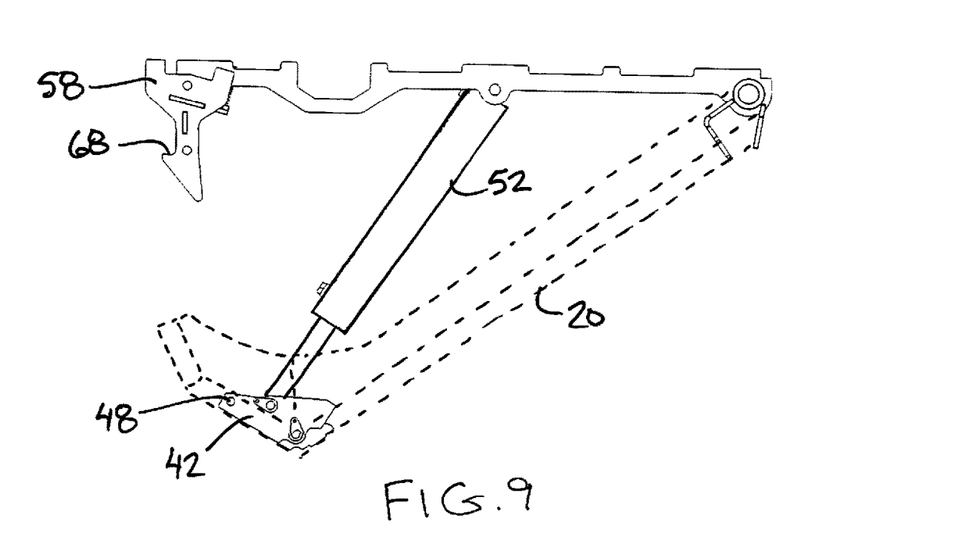
FIG. 9 is a side elevational view of the jack assembly upon further extension of the linear actuator from the raised position subsequent to release of the catch.
Figure 10:
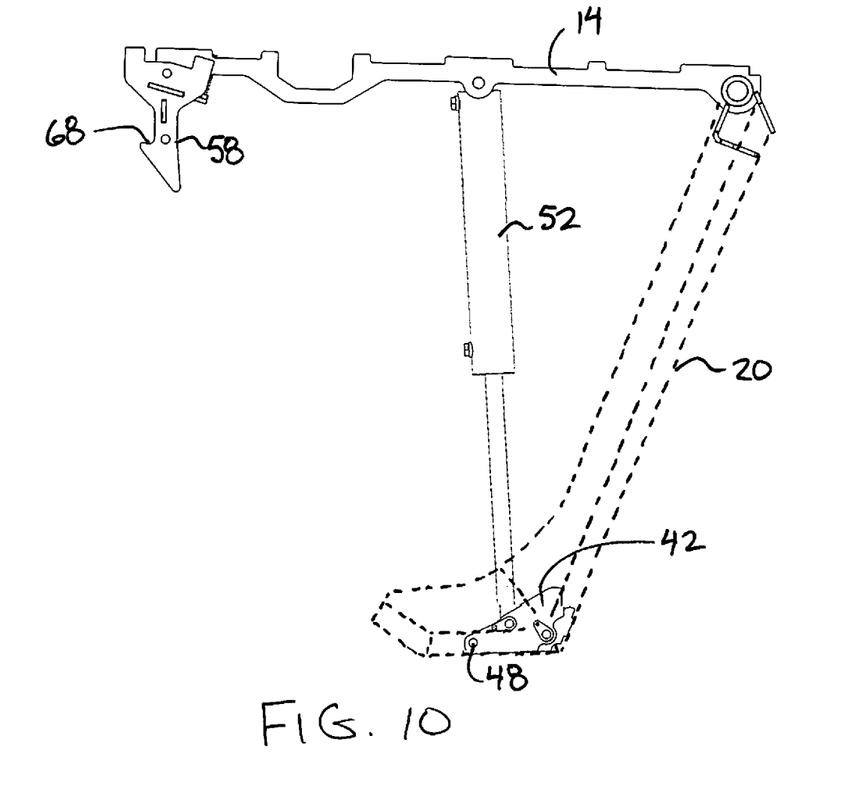
FIG. 10 is a side elevational view of the jack assembly in the lowered position.

Continued extension of the linear actuator 52 from the released condition of the link member 42 allows the leg to be pivoted downwardly to the intermediate position of FIG. 9. Continued extension of the linear actuator 52 from the intermediate position of FIG. 9 will locate the leg in the lowered position of FIG. 10. Any weight bearing on the jack assembly ensures that the link member 42 remains in the first position thereof abutted against the foot member 28.

When returning to the raised position, initial retraction of the linear actuator from the lowered position will pivot the link member 42 relative to the leg into the second position as shown in FIG. 11. Continued retraction of the linear actuator 52 will then raise the leg as further shown in FIG. 11 so that the crossbar 48 is aligned with the camming surface 72 on the retainer member 58. As described above, continued retraction of the linear actuator into the raised position of the assembly will cause the cross bar to engage the camming surface 72 and deflect the retainer member into the unlatched position until the crossbar is positioned over the first catch surface on the retainer member, at which point the biasing of the spring 74 will return the retainer member to the latched position shown in FIG. 7.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A jack assembly operable relative to a wheeled frame to support the wheeled frame relative to a ground surface upon which the wheeled frame is supported, the jack assembly comprising:
    a jack frame arranged to be supported in fixed relation to the wheeled frame;
    a leg pivotally supported on the jack frame such that the leg is pivotal relative to the jack frame about a first pivot axis between a raised position adjacent the jack frame and a lowered position extending downwardly from the first pivot axis such that a bottom end of the leg is lower in the lowered position than in the raised position;
    a retainer member pivotally supported on the jack frame such that the retainer member is pivotal relative to the jack frame about a second pivot axis spaced from the first pivot axis;
    the retainer member including a first catch surface thereon;
    the retainer member being pivotal between a latched position and an unlatched position in which the first catch surface is closer to the first pivot axis in the unlatched position than in the latched position;
    the retainer member being biased towards the latched position;
    a link member pivotally supported at a first end of the link member on the leg at a location spaced from the first pivot axis;
    the link member including a second catch surface formed thereon;
    the link member being pivotal relative to the leg between a first position and a second position in which the second catch surface is closer to the first pivot axis in the second position than the first position; and
    a linear actuator which is actuatable to be extended in length between opposing first and second ends of the linear actuator from a retracted position of the linear actuator to an extended position of the linear actuator;
    the first end of the linear actuator being pivotally coupled to the jack frame at an intermediate location between the first pivot axis and the second pivot axis;
    the second end of the linear actuator being pivotally coupled to the link member at a location spaced from the first end of the link member;
    in the retracted position of the linear actuator, the leg being located in the raised position and the link member being located in the second position such that the second catch surface on the link member is retained on the first catch surface of the retainer member to prevent downward displacement of the leg towards the lowered position;
    in the retracted position of the linear actuator, the link member being movable from the second position to the first position to release the second catch surface from the first catch surface in response to initial extension of the linear actuator from the retracted position; and
    the retainer member being movable from the latched position to the unlatched position against biasing of the retainer member by engagement of the link member in response to retraction of the linear actuator from the extended position to the retracted position.

2. The jack assembly according to claim 1 wherein the retainer member comprises a hook defining the first catch surface, the hook having an open side facing outwardly and away from the first pivot axis.

3. The jack assembly according to claim 1 wherein the link member comprises a crossbar extending parallel to the first pivot axis, the crossbar defining the second catch surface thereon.

4. The jack assembly according to claim 1 wherein the retainer member includes a camming surface thereon which is slidably engaged by the link member to displace the retainer member from the latched position to the unlatched position against the biasing in response to retraction of the linear actuator from the extended position to the retracted position.

5. The jack assembly according to claim 1 wherein the leg comprises an upright member spanning a height of the leg in the lowered position, and a foot member joined to the upright member at the bottom end of the leg, the foot member extending transversely outward from the upright member.

6. The jack assembly according to claim 5 wherein the link member is pivotally coupled to the leg in proximity to the bottom end of the leg, the link member being abutted with the foot member in the foot member in the first position of the link member and being abutted with the upright member in the second position of the link member.

7. The jack assembly according to claim 1 wherein the linear actuator comprises a hydraulic linear actuator.

8. The jack assembly according to claim 1 in combination with the wheeled frame, the wheeled frame comprising a trailer frame having a hitch arranged for connection to a towing vehicle, the jack frame being supported on the trailer frame in proximity to the hitch.

9. The jack assembly according to claim 8 wherein the wheeled frame comprises an agricultural implement frame.

* * * * *